United States Patent [19]

Kubo

[11] Patent Number: 4,842,296
[45] Date of Patent: Jun. 27, 1989

[54] VEHICLE SUSPENSION SYSTEM FOR A STEERABLE WHEEL

[75] Inventor: Kanji Kubo, Saitama, Japan

[73] Assignee: Honda Giken Kogyo Kabushiki Kaisha, Tokyo, Japan

[21] Appl. No.: 135,250

[22] Filed: Dec. 21, 1987

[30] Foreign Application Priority Data

Dec. 27, 1986 [JP] Japan .................. 61-314022

[51] Int. Cl.⁴ .................................................. B60G 3/00
[52] U.S. Cl. ........................................ 280/663; 280/675
[58] Field of Search ............... 280/688, 690, 691, 696, 280/701, 668, 666, 663, 675, 673

[56] References Cited

U.S. PATENT DOCUMENTS 4,440,420 4/1984 Muller .................................. 280/691
4,681,342 7/1987 Goerich .............................. 280/690

FOREIGN PATENT DOCUMENTS 3642421 6/1987 Fed. Rep. of Germany ...... 280/701
52-9889 3/1977 Japan .
2172254 9/1986 United Kingdom ................ 280/696

Primary Examiner—Charles A. Marmor
Assistant Examiner—Ross Weaver
Attorney, Agent, or Firm—Nixon & Vanderhye

[57] ABSTRACT

In a four-link parallel link vehicle suspension system, a generatrix or an imaginary king pin is defined as a line connecting an instantaneous center of rotation of the knuckle as defined by an upper pair of lateral links with another instantaneous center of the rotation as define by a lower pair of lateral links and the range of the intersection of the imaginary king pin with the tread contact surface is minimized for the purpose of reducing the change in the force required to maintain a certain steering angle of the wheel. Thereby, the handling of the vehicle is improved through the reduction in change in the force required to maintain a steering angle of the wheel while maintaining the freedom of parameter setting which is intrinsic to the four-link parallel link vehicle suspension system.

6 Claims, 2 Drawing Sheets

VEHICLE SUSPENSION SYSTEM FOR A STEERABLE WHEEL

TECHNICAL FIELD

The present invention relates suspension system for a steerable wheel and in particular to such a suspension system for a steerable wheel which minimizes the change in the force required to maintain a steering angle as the wheel is steered.

BACKGROUND OF THE INVENTION

In a conventional suspension system for a steerable wheel, the knuckle which rotatably supports a wheel is typically pivoted at its upper and lower points, respectively, to the free ends of, for instance, a pair of A-arms which are pivotally connected to the vehicle body at their base ends so as to allow a vertical motion and a steering action of the wheel. In such a suspension system, an imaginary king pin can be defined as a line connecting the upper and the lower pivot points of the knuckle. The wheel is steered about this imaginary king pin but, since the center of the tread contact surface of the wheel and the point of intersection between the imaginary king pin and the tread contact surface generally do not coincide with each other, the so-called self aligning torque which tends to restore the wheel to a straight ahead position is normally produced.

When a manual steering system is used, this self-aligning torque is naturally transmitted to the steering wheel and gives the feel of the state of the steered wheels to the driver. Even when a power assisted steering system is used, the reaction which the wheels experience from the road is allowed to be transmitted from the steered wheel to the steering wheel so as to improve the handling of the vehicle by giving the feel of the steered wheel to the driver. In either case, this self-aligning torque is required to be controlled to a manageable level and should not increase or decrease abruptly as the steering angle is changed.

In the case of a steerable rear wheel of a vehicle equipped with a four-wheel steering system in which the ratio of the steering angle of the rear wheels to the steering angle of the front wheels is varied depending on the speed of the vehicle or the steering angle of the front wheels, the self-aligning torque may change in a highly complex way without offering any benefit and it is desirable to totally eliminate the self-aligning torque if possible.

When the king pin, real or imaginary, is fixed as is the case with most of the conventional suspension systems, the self-aligning torque can be easily eliminated by allowing the king pin intersect with the center of the tread contact surface of the wheel but when that cannot be done because of other considerations then it is impossible to control the self-aligning torque.

On the other hand, in a suspension system of the kind disclosed in Japanese Patent Publication No. 52-9889 having two pairs of lateral links connected to upper and lower parts of the knuckle, respectively, it is possible to change the various parameters of the suspension system and favorable settings of the camber angle, the toe angle and caster angle can be obtained as desired, but since the imaginary king pin moves as the steering angle changes and the resulting change in the self-aligning torque or the force required to maintain a steering angle tends to vary a great deal or in a complicated fashion and may not be sufficiently manageable.

BRIEF SUMMARY OF THE INVENTION

In view of such problems of the prior art, a primary object of the present invention is to provided an improved suspension system of the kind having two pairs of lateral links which are pivoted to upper and lower parts of a knuckle, which reduces the change in the force required to maintain a steering angle.

Another object of the present invention is to provide a suspension system for a steerable wheel using four lateral links which minimizes the force required to maintain a steering angle while allowing much freedom in the setting of various wheel alignment parameters.

According to the present invention, such objects can be accomplished by providing a suspension system for a steerable wheel, comprising a knuckle rotatably supporting a wheel, two pairs of lateral links, each pair being located one above the other, having outer ends pivotally connected to upper and lower parts of the knuckle, respectively, and inner ends pivotally connected to a vehicle body, so as to allow a steering action and a vertical motion of the knuckle, wherein: a tread contact surface is made to coincide with a certain horizontal plane in such a manner that a range of a curve given as a curve of intersection between the horizontal plane and a trajectory surface defined by a generatrix which is formed by connecting an instantaneous center of rotation of the knuckle as given by the upper pair of the lateral links with another instantaneous center of rotation of the knuckle as given by the lower pair of the lateral links is minimized for a given range of steering angle.

Thus, by controlling the change in the distance between the imaginary king pin and the center of the tread contact surface to a minimum, the change in the force required to maintain a steering angle is minimized while maintaining the freedom of parameter setting which is intrinsic to the four-link parallel link vehicle suspension system.

In particular, since the component of the distance between the imaginary king pin and the center of the tread contact surface along the fore-and-aft direction of the vehicle is important in view of controlling the self-aligning torque, it is preferred if the range of the curve given as a curve of intersection between the horizontal plane and the trajectory surface along the fore-and-aft direction is minimized for a given range of steering angle.

And, this invention is particularly significant when it is applied to a rear wheel of a vehicle equipped with a four wheel steering system.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
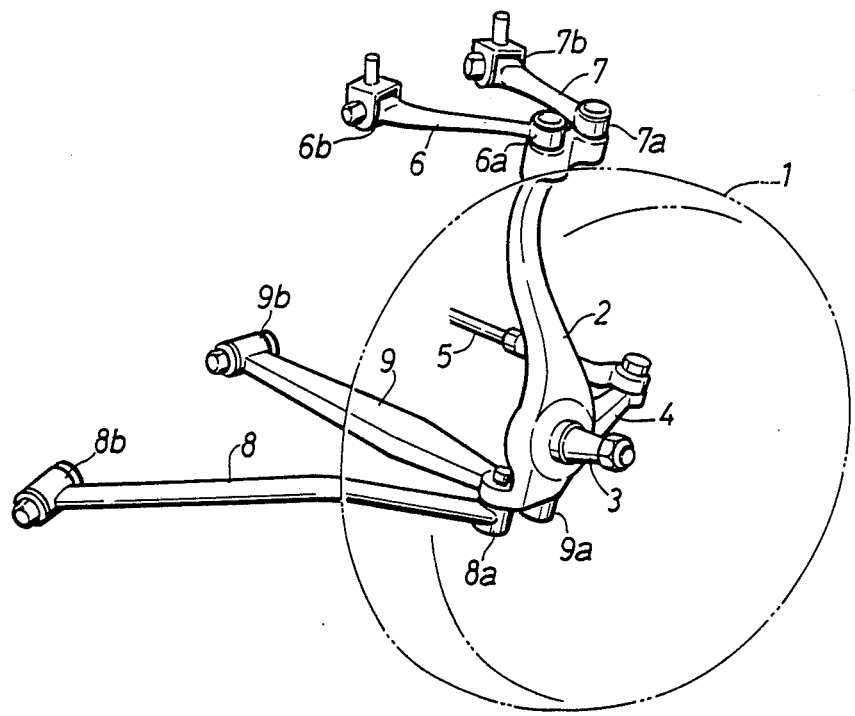
FIG. 1 is a perspective view of an embodiment of the suspension system according to the present invention.

FIG. 1 is a perspective view of a suspension system for a steerable wheel according to the present invention as applied to a rear wheel of a vehicle equipped with a four wheel steering system. The wheel 1 is rotatably supported on a spindle 3 which laterally and integrally projects from a knuckle 2. A knuckle arm 4 integrally projects inwardly and rearwardly from a lower part of the knuckle 2 and the free end of the knuckle arm 4 is pivotally connected to a tie rod 5 which transmits a force for steering action.

The outer ends 6a and 7a of a pair of links 6 and 7 are connected to upper parts of the knuckle 2 which are spaced from each other along the fore-and-aft direction, by way of ball joints, while the inner ends 6b and 7b of these links 6 and 7 are likewise connected to a vehicle body not shown in the drawings by way of ball joints. The outer ends 8a and 9a of another pair of links 8 and 9 are likewise connected to lower parts of the knuckle 2 by way of ball joints while the inner ends 8b and 9b of these links 8 and 9 are connected to the vehicle body by way of rubber-mounted bushes. The inner ends 8b and 9b of these links may be connected to the vehicle body by way of ball joints but the lateral angular changes of these links in relation with the vehicle body are so small that the rubber-mounted bushes can safely permit the angular changes in the links 8 and 9.

Thus, the wheel 1 is supported so as to be able to travel vertically and the changes in the camber angle, the caster angle and the toe angle of the wheel 1 can be freely determined by appropriately changing the lengths and the locations of the pivot points of these links 6 to 9. By applying an actuating force to the tie rod 5, a steering force is transmitted to the knuckle 2 and the wheel 1 is steered around an imaginary king pin as described hereinafter.

Figure 2:
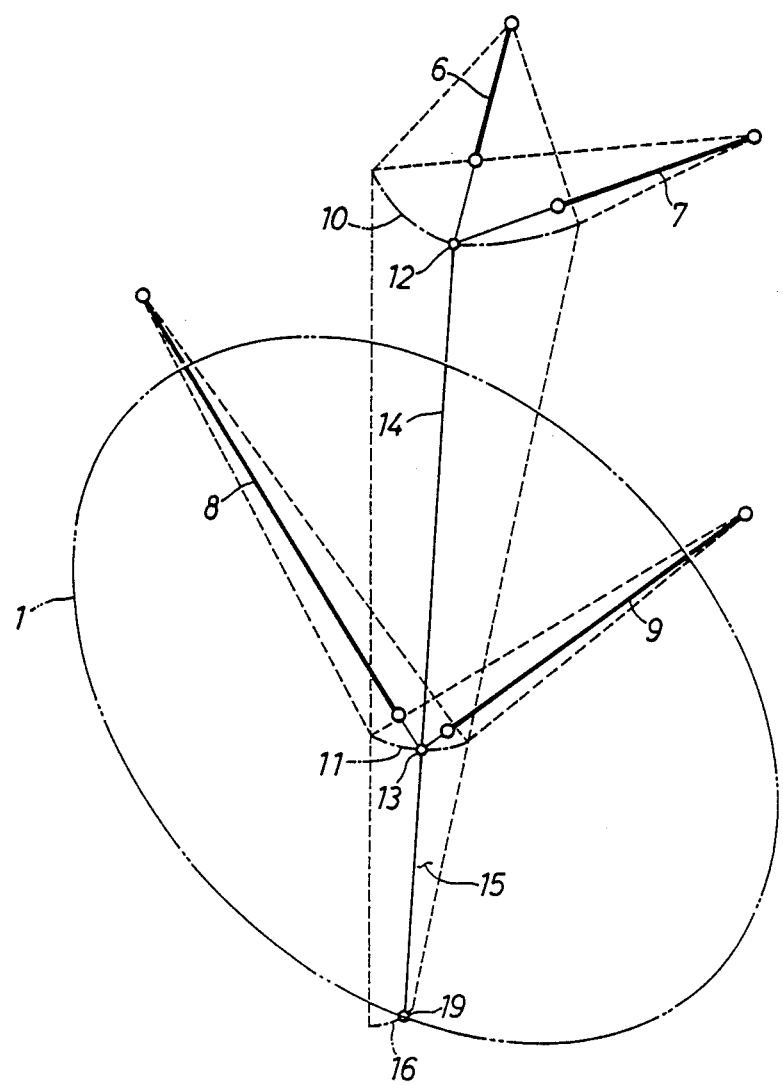
FIG. 2 is a skeleton diagram of the embodiment of FIG. 1.

When the links 6 and 7 are considered, as shown in FIG. 2, the instantaneous center of rotation 12 of an upper part of the knuckle 2 is given as a trajectory 10 of the intersection of the extensions of the links 6 and 7. When the links 8 and 9 are considered, the instantaneous center of rotation 11 of a lower part of the knuckle 2 is given as a trajectory 11 of the intersection of the extensions of the links 8 and 9. Thus, the central axis of rotation of the knuckle 2 or the imaginary king pin 14 is given by a line connecting these instantaneous centers of rotation 12 and 13. As the steering angle changes, the imaginary king pin 14 moves and defines a trajectory surface 15 which is given as a conical or a slightly twisted conical surface, the imaginary king pin 14 giving the generatrix for this trajectory surface 15.

Figure 3:
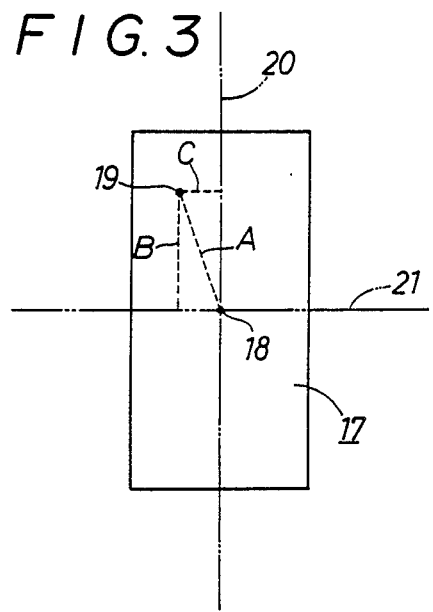
FIG. 3 is a diagram of the tread contact surface.

According to the present invention, as shown in FIG. 2, the trajectory 10 of the upper part 12 of the imaginary king pin 14 is relatively long while the trajectory 11 of the lower part 13 of the imaginary king pin 14 is relatively short so that the trajectory surface 15 converges downwards and the range of the trajectory 16 of the intersection 19 of the imaginary king pin 14 with the tread contact surface of the tire or the intersection of the trajectory surface 15 with the tread contact surface is minimized. In particular, as shown in FIG. 3 which shows the tread contact surface 17, the force required to maintain a certain steering angle of the wheel is determined by a longitudinal trail B or the longitudinal component of the trail A which is given by the length of a straight line connecting the center 18 of the tread contact surface and the point of intersection 19 between the imaginary king pin 14 and the tread contact surface 17 along the fore-and-aft direction (imaginary line 20). Thus, by minimizing the change in the longitudinal trail B, the change in the force required to maintain a certain steering angle can be minimized. Since the change in the force required to maintain a certain steering angle due to the presence of the lateral trail C or the lateral component of the trail A along the lateral direction (imaginary line 21) of the vehicle is canceled by the contributions from the right and the left wheels, it does not affect the change in the force required to maintain a certain steering angle to any appreciable degree.

Thus, according to the present invention, since various parameters of the suspension system can be optimized by using two pairs of lateral links, the pairs being located one above the other, and the change in the force required to maintain a certain steering angle can be minimized by controlling the change in the longitudinal trail of the wheel, a considerable advantage can be obtained in improving the handling of the vehicle through appropriate designing of the suspension system.

What I claim is:

1. A suspension system for a steerable wheel, comprising a knuckle rotatably supporting a wheel, two pairs of lateral links, each pair being located one above the other, having outer ends pivotally connected to upper and lower parts of the knuckle, respectively, and inner ends pivotally connected to a vehicle body, so as to allow a steering action and a vertical motion of the knuckle, wherein:

a tread contact surface is made to coincide with a certain horizontal plane in such a manner that a range of a curve, given as a curve of a intersection between the horizontal plane and trajectory surface defined by a generatrix which is formed by connecting an instantaneous center of rotation of the knuckle as given by the upper pair of the lateral links with another instantaneous center of rotation of the knuckle as given by the lower pair of the lateral links is minimized for a given range of steering angle, wherein said trajectory surface comprises a conical surface convergent from said upper lateral links toward said horizontal plane.

2. A suspension system for a steerable wheel as defined in claim 1, wherein the range of the curve given as a curve of intersection between the horizontal plane and the trajectory surface along a fore-and-aft direction is minimized for a given range of steering angle.

3. A suspension system for a steerable wheel as defined in claim 2, wherein the steerable wheel is a rear wheel of a vehicle equipped with a four wheel steering system.

4. A suspension for a steerable wheel as defined in claim 1 wherein movement of said instantaneous centers of rotation of said knuckle as given by both upper and lower arms is substantially aligned with a longitudinal axis of said vehicle body.

5. A suspension for a steerable wheel as defined in claim 2 wherein movement of said instantaneous centers of rotation of said knuckle as given by both upper and lower arms is substantially aligned with a longitudinal axis of said vehicle body.

6. A suspension for a steerable wheel as defined in claim 3 wherein movement of said instantaneous centers of rotation of said knuckle as given by both upper and lower arms is substantially aligned with a longitudinal axis of said vehicle body.

* * * * *